Patented Sept. 14, 1954

2,689,266

UNITED STATES PATENT OFFICE 2,689,266

NAPHTHALENE PRODUCTION

Harry L. Coonradt and Carlos L. Gutzeit, Woodbury, and Barton W. Rope, Mullica Hill, N. J., assignors to Socony-Vacuum Oil Company, Incorporated, a corporation of New York No Drawing. Application September 16, 1952, Serial No. 309,925

5 Claims. (Cl. 260—672)

This invention relates to the production of naphthalene. It is more particularly concerned with the catalytic demethylation of methylnaphthalenes to naphthalene in the presence of nickel oxide-chromia-alumina catalysts.

As is well known to those familiar with the art, the dealkylation of an alkylaromatic hydrocarbon, having at least 2 carbon atoms in the side chain, is relatively easy to achieve in excellent yields. As opposed thereto, however, demethylation, i. e., the removal of a methyl group, has been difficult to achieve. It has been proposed, in U. S. Patent No. 2,194,449, to demethylate methyl naphthalenes by contacting them with silica-alumina catalysts. In U. S. Patent No. 2,422,673, it has been proposed to dealkylate or demethylate alkylaromatic hydrocarbons in the presence of a nickel catalyst, with hydrogen under pressure. It is taught, in U. S. Patent No. 2,431,940, that in the presence of a catalyst comprising nickel on silica-alumina, alkylbenzenes other than methylbenzenes are dealkylated to benzene. In so far as is now known, it has not been proposed to demethylate methylnaphthalenes in the presence of the novel catalyst described hereinafter.

It has now been found that methylnaphthalenes can be demethylated to naphthalene by a catalytic process which involves a novel nickel oxide-containing catalyst. It has been discovered that naphthalene can be produced in good yields from methylnaphthalenes by contacting the methylnaphthalenes, in the presence of hydrogen, with a nickel oxide-chromia-alumina catalyst.

Accordingly, it is a broad object of the present invention to provide a novel catalytic process for the production of naphthalene in good yields. Another object is to provide a novel nickel oxide-containing catalyst for the demethylation of methylnaphthalenes. A specific object is to provide a process for demethylating methylnaphthalenes to naphthalene in the presence of a nickel oxide-chromia-alumina catalyst. Other objects and advantages of the present invention will become apparent to those skilled in the art from the following detailed description.

In general, the present invention provides a process for producing naphthalene from a methylnaphthalene, which comprises contacting the methylnaphthalene with a nickel oxide-chromia-alumina catalyst, at a temperature of between about 900° F. and about 1200° F., for a contact time of between about one second and about 60 seconds, and in the presence of hydrogen gas at substantially atmospheric pressure.

The charge stocks utilizable herein are the methylnaphthalenes and the polymethylnaphthalenes. These materials can be relatively pure compounds, or they can be mixtures of two or more methylnaphthalenes. The process is also applicable to charge stocks comprising methylnaphthalenes along with other hydrocarbon materials, such as, for example, certain highly aromatic petroleum fractions. Non-limiting examples of the methylnaphthalene charge materials are 1-methylnaphthalene; 2-methylnaphthalene; 1,3-dimethylnaphthalene; 1,8-dimethylnaphthalene; 2,7-dimethylnaphthalene; 1,2,5-trimethylnaphthalene; 1,2,7-trimethylnaphthalene; 2,3,6-trimethylnaphthalene; 1,2,4,8-tetramethylnaphthalene; 1,2,6,8-tetramethylnaphthalene; 1,2,4,6,8-pentamethylnaphthalene; and 1,2,4,5,8-pentamethylnaphthalene.

The catalyst utilized in the process of this invention is a nickel oxide-chromia-alumina catalyst. The method of making the catalyst is not a critical factor. Thus, it can be prepared by impregnation or by coprecipitation. Coprecipitation methods utilizable are the usual methods for coprecipitating metal oxides, in the form of hydroxides, from an aqueous solution of water-soluble salts thereof. The slurry, thus obtained, can be aged, filtered, and dried. Before drying, or immediately thereafter, the catalyst is pelleted or otherwise shaped. Then, the formed catalyst is further dried and finally calcined. If desired, the catalyst can include minor amounts of materials, such as alkali-metal salts, for the purpose of improving regeneration properties of the catalyst. Such metal salts do not appreciably detract from or add to the catalytic properties of the catalyst with respect to demethylation.

The amount of nickel oxide, calculated as nickelic oxide ($Ni_2O_3$), present in the finished catalyst will vary between about 5 mole per cent and about 45 mole per cent. The amount of chromia ($Cr_2O_3$) will also vary between about 5 mole per cent and about 45 mole per cent. It is essential, however, that the total amount of nickel oxide and chromia should not exceed 50 mole per cent. It follows, therefore, that the minimum amount of alumina utilizable is about 50 mole per cent, and that the maximum amount is about 90 mole per cent. A preferred catalyst is one containing about 15 mole per cent chromia, about 15 mole per cent nickel oxide, and about 70 mole per cent alumina. The physical form of the catalyst is not an essential factor. Accordingly, the catalyst can be in the form of lumps, rods, pellets, spherical beads, and the like.

In order to obtain good yields of naphthalene by the process of this invention, the process should be carried out in the presence of hydrogen gas, or of a gaseous mixture rich in hydrogen. The molar proportion of hydrogen to methylnaphthalene can vary between about 1:2, respectively, and about 10:1, respectively, and, preferably between about 6:1, respectively, and about 2:1, respectively. In general, optimum yields of naphthalene are obtained at about atmospheric pressure or lower. However, superatmospheric pressures can be employed.

The contact temperature, i. e., the temperature of catalyst, should be between about 900° F. and about 1200° F. It is prefered, however, to operate at temperatures of between about 900° F. and about 1050° F. The contact time is dependent upon the temperature. As is often the case in catalytic processes, the shorter contact times are desirable at higher temperatures, and vice versa. In general, the contact time will be between about one second and about 60 seconds. It is preferable to operate at contact times of between about one second and about ten seconds.

The process of this invention can be carried out batchwise or continuously in any reaction vessel ordinarily used for contact catalytic reactions. The catalyst bed can be a fixed or a moving bed. Contact between the catalyst and the charge can be effected by passing the charge over the catalyst, or through it. In case of a moving bed of catalyst, the charge can be introduced in a concurrent flow or in a countercurrent flow.

The following specific examples are for the purpose of demonstrating the process of this invention. It must be understood, however, that this process is not to be limited by the specific catalysts, reactants, and conditions used in the examples, or to the operations and manipulations involved therein. A wide variety of other reactants and catalyst compositions, and conditions, as set forth hereinbefore, can be used, as those skilled in the art will readily appreciate.

The reactors used in the experimental work were stainless steel tubes which held 150 cc. of catalyst. The reactor used for Examples 4–7 was suspended in a molten salt bath and reactants were passed upward through the catalyst bed. The reactor used for Examples 1–3 and 8 was suspended in a molten lead bath, and the reactants were passed downward through the catalyst bed. The temperature of the catalyst bed was controlled throughout to within 10° F. in each reactor. Accessory equipment included a thermostatted burette to measure the charge, gas supply system, pumps, preheater coil, condensing and collecting system, and a system to determine coke on the catalyst by combustion.

The catalyst was purged at operating conditions with nitrogen and then with hydrogen (except in Example 1 where no hydrogen was used). A sample of the total gas product was analyzed in the mass spectrometer. Coke on the catalyst was determined by combustion. The carbon dioxide was absorbed and weighed; the total weight of coke was taken as the weight of carbon in the coke plus 5 per cent to correct for hydrogen in the coke. The aromatic products were distilled on a column of 15 theoretical plates. The relative amounts of aromatic materials present in a sample of the liquid products was determined by usual methods, i. e., by mass spectrometer, ultraviolet light spectrometer, distillation, etc.

CATALYST PREPARATION

Catalyst A

A stock solution was prepared from $Ni(NO_3)_3$, $Cr(NO_3)_3$ and $Al(NO_3)_3$; the solution per liter corresponded to 0.25 mole of mixed oxides corresponding to the mole ratio of $$Ni_2O_3:Cr_2O_3:Al_2O_3—15:15:70$$

To this solution was added soluble starch in the ratio of 100 g. starch per mole of oxides. For each one liter of this solution there was used approximately one liter of 1.5 molar $NH_4OH$. The two solutions were allowed to flow into the upper part of a mixing chamber, the greater part of which was filled by a rapidly rotating, slotted metal cylinder. The slurry of metal oxides so formed was allowed to flow by gravity into a glass chamber containing glass and calomel electrodes connected to a pH meter. The rates of addition of the reactant streams to the mixing chamber were adjusted to produce a slurry at a pH of $8.5 \pm 0.05$. This slurry was aged for 24 hours and filtered. The precipitate was water-washed until the filtrate gave a negative test for nitrate ions with diphenylamine-sulfuric acid indicator. A solution of potassium nitrate was added to the filter cake in the ratio of 0.03 mole of potassium nitrate per mole of metal oxide. The filter cake was then dried in an air-circulation drying oven for about 18 hours and formed into ⅛ inch pellets with 10 wt. per cent "Stereotex" as a lubricant. The pelleted material was gradually heated to 300° C. in a hydrogen steam over an eight hour period during which time most of the lubricant was removed by distillation. The pellets were then heated further in a carbon dioxide stream for eight hours while gradually increasing the temperature to 600° C., after which the last traces of carbonaceous material were removed by passing air over the catalyst at 600° C.

Catalyst B

The catalyst was prepared in exactly the same manner as for Catalyst A, but no potassium nitrate was used.

EXAMPLE 1

A run was made, in which 2-methylnaphthalene was contacted with Catalyst B at about 1000° F., for about 50 seconds contact time, and in the absence of hydrogen or other added gases. Pertinent data and results of this run are set forth in Table I.

EXAMPLE 2

A run was made, in which 2-methylnaphthalene was contacted with Catalyst A, at about 900° F., for about 2.5 seconds contact time, and in the presence of hydrogen added in a molar proportion of hydrogen to 2-methylnaphthalene of about 6:1 at atmospheric pressure. Pertinent data and results for this run are set forth in Table I.

EXAMPLE 3

2-methylnaphthalene was contacted with Catalyst A, in the presence of hydrogen, using the same conditions as in Example 2, with the exception that a temperature of 1000° F. was employed. Pertinent data and results therefor are set forth in Table I.

In order to compare the present process with processes using nickel and nickel oxide catalysts proposed in the prior art, several runs were made using various conditions:

EXAMPLES 4 THROUGH 7

Four runs were made using a nickel-nickel oxide on kieselguhr catalyst under conditions specified for such catalyst. In each run, 2-methylnaphthalene was contacted with the catalyst, at temperatures in the range of 400-515° F., for 10-second contact time, and at atmospheric pressure (except for Example 7), in the presence of hydrogen gas added in molar proportions of the range, 0.5-6.0. Pertinent data for each run are set forth in Table I. It was found that very low yields were achieved in all cases, whether small or large amounts of hydrogen were used. In Example 7, operated under superatmospheric pressures (as preferred by many prior art processes) it was found that hydrogenation of the aromatic nucleus was preferred over the hydrogenolysis of the methyl group. In all cases, the low yields of products included many products boiling at 200-235° C. other than naphthalene. Analysis for naphthalene showed that a very small percentage of this fraction was naphthalene. Accordingly, the actual conversion to naphthalene never exceeded a yield of more than 3 per cent.

EXAMPLE 8

A charge of 2-methylnaphthalene was contacted with a catalyst comprising 10 per cent nickel oxide on alumina, at 900° F., for 2.5 seconds, and in the presence of hydrogen gas in a 6:1 molar proportion at atmospheric pressure. A yield of naphthalene of 7.3 per cent was obtained. Pertinent data are set forth in Table I.

be noted that, in the absence of hydrogen, appreciable yields of naphthalene are realized (Example 1). However, when hydrogen is added, yields as high as 65 per cent are obtained, using the nickel oxide-chromia-alumina catalyst. In contrast thereto, the best yield obtainable using a nickel oxide-alumina catalyst (with no chromia in the catalyst) was about 7 per cent. When using a metallic nickel catalyst, hydrogenation of the aromatic nucleus predominated.

The products produced by the process of this invention have many uses and applications well known to those skilled in the art. Thus, naphthalene is a well known larvicide, and an intermediate for the production of phthalic acid anhydride by the oxidation thereof. Methylphthalic acid anhydrides are produced from the methylnaphthalenes.

Although the present invention has been described in conjunction with preferred embodiments, it is to be understood that modifications and variations can be resorted to without departing from the spirit and scope of this invention, as those skilled in the art will readily understand. Such variations and modifications are considered to be within the scope and purview of the appended claims.

What is claimed is:

1. A process for the production of naphthalene from a methylnaphthalene which comprises contacting said methylnaphthalene with a catalyst consisting essentially of between about 5 and about 45 mole per cent nickel oxide, between about 5 and about 45 mole per cent of chromia, and between about 50 and about 90 mole per cent of

| Example | Catalyst [A] | Charge Stock [D] | | Hydrogen Added | | | Temp., °F. | Length of Run, Min. | Methylnaphthalene L. H. S. V. [G] | Contact Time, Sec. [F] |
|---|---|---|---|---|---|---|---|---|---|---|
| | | G. | G./Min. | CC./Min. at S. T. P. | Moles | Moles per Mole Charge | | | | |
| 1 | (B) | [E] 48.5 | 0.385 | 0 | 0 | 0 | 1,000 | 126 | 0.156 | 50.0 |
| 2 | (A) | 98.6 | 1.18 | 1,120 | 4.18 | 6.0 | 900 | 83.4 | 0.480 | 2.5 |
| 3 | (A) | 69.0 | 1.10 | 1,040 | 2.91 | 6.0 | 1,000 | 62.6 | 0.448 | 2.5 |
| 4 | (C) | 98.7 | 2.19 | 1,720 | 0.347 | 0.5 | 408 | 45.2 | 0.886 | 10.0 |
| 5 | (C) | 98.6 | 1.95 | 1,540 | 0.347 | 0.5 | 500 | 50.7 | 0.790 | 10.0 |
| 6 | (C) | 98.6 | 0.468 | 423 | 3.98 | 5.8 | 400 | 211 | 0.190 | 10.4 |
| 7 | (C) | 98.6 | 9.39 | [P] 8,880 | 4.16 | 6.0 | 400-515 | 10.5 | 3.87 | 10.0 |
| 8 | (B) | 98.5 | 1.12 | 1,120 | 4.16 | 6.0 | 900 | 83.5 | 0.479 | 2.5 |

| Example | Yield of Products [H] Weight Percent Per Pass | | | | | | Yield of Products [H, I] Ultimate Weight Percent | | | |
|---|---|---|---|---|---|---|---|---|---|---|
| | Naphthalene | Low Boilers [L] | Residue | Coke | Gas | Total | Naphthalene | Low Boilers | Coke | Gas |
| 1 | [R] 15.2 | | 11.0 | | 2.6 | | [J] 17.2 | | | |
| 2 | [S] 18.5 | [Q] 2.1 | 71.0 | 7.3 | 4.2 | 103.1 | 57.6 | [Q] 6.6 | 22.8 | 13.0 |
| 3 | [S] 12.2 | 1.0 | 77.7 | 2.6 | 3.0 | 96.5 | 64.6 | 5.4 | 13.8 | 16.2 |
| 4 | (M) | 1.1 | 93.9 | 33.4 | 0.1 | | | | | |
| 5 | (N) | 1.4 | 91.6 | | 0.5 | | | | | |
| 6 | [O] 1.2 | 5.0 | 45.0 | 14.6 | | | [J] 2.2 | | [J] 27.3 | |
| 7 | (K) | 6.1 | 16.2 | | | | | | | |
| 8 | 1.0 | 0.6 | 78.9 | 3.5 | 8.8 | 92.8 | 7.3 | 4.4 | 24.8 | 63.5 |

[A] Catalyst volume—150 cc.
[B] 10% nickel oxide on alumina.
[C] Nickel and nickel oxide on kieselguhr. Reduced by hydrogen at reaction temperature.
[D] 2-methylnaphthalene-Reilly (purified, ultraviolet analysis indicated 99.4% purity) unless otherwise indicated.
[E] Eastman practical 2-methylnaphthalene.
[F] Based on total charge to reactor and assuming 150 cc. of voids.
[G] Volume of 2-methylnaphthalene at 50° C./vol. catalyst/hour.
[H] Both yield per pass and ultimate yield are expressed as weight per cent methylnaphthalene charged.
[I] Based on ratios of naphthalene, coke and gas unless otherwise indicated.
[J] Based on weight per cent conversion per pass/weight per cent methylnaphthalene consumed.
[K] Liquid; $N_D^{20}$ 1.4730; actual content of naphthalene not determined but refractive index indicates largely hydrogenation products.
[L] Liquid boiling below 200° C.
[M] Liquid; $N_D^{20}$ 1.5250. Actual naphthalene content not determined but less than 2.0%.
[N] Semisolid. Actual naphthalene content not determined but less than 2.8%.
[O] Plus 40.0% other liquid B. P. 200-235° C. Analysis by ultraviolet absorption.
[P] Pressure 280 lb. gauge (twenty atmospheres).
[Q] Composition: 55% toluene, 21% benzene, 24% other alkylbenzenes.
[R] Fraction B. P. 214-220° C.; M. P. 61-71° C.
[S] Naphthalene determined by ultraviolet absorption analysis of fraction B. P. 200-235° C.

The advantages of the present process will be apparent from the foregoing examples. It will alumina, the total mole per cent of nickel oxide and chromia therein being less than 50 mole per cent, at a temperature of between about 900° F. and about 1200° F., for a period of time of between about one second and about 60 seconds, in the presence of hydrogen gas at substantially atmospheric pressure; the molar proportion of hydrogen to methylnaphthalene varying between about 1:10 to 10:1.

2. A process for the production of naphthalene from a monomethylnaphthalene which comprises contacting said monomethylnaphthalene with a catalyst consisting essentially of between about 5 and about 45 mole per cent nickel oxide, between about 5 and about 45 mole per cent chromia, and between about 50 and about 90 mole per cent alumina, the total mole per cent of chromia and nickel oxide being less than 50 mole per cent, at a temperature of between about 900° F. and about 1050° F., for a period of time of between about one second and about 10 seconds, and in the presence of hydrogen gas at substantially atmospheric pressure; the molar proportion of hydrogen to monomethylnaphthalene varying between about 1:1 and about 10:1.

3. A process for the production of naphthalene from a monomethylnaphthalene which comprises contacting said monomethylnapthalene with a catalyst consisting essentially of about 15 mole per cent nickel oxide, about 15 mole per cent chromia, and about 70 mole per cent alumina, at a temperature of between about 900° F. and about 1050° F., for a period of time of between about one second and about 10 seconds, and in the presence of hydrogen gas at substantially atmospheric pressure; the molar proportion of hydrogen to monomethylnaphthalene varying between about 1:1 and about 10:1.

4. A process for the production of naphthalene from a 2-methylnaphthalene which comprises contacting said 2-methylnaphthalene with a catalyst consisting essentially of about 15 mole per cent nickel oxide, about 15 mole per cent chromia, and about 70 mole per cent alumina, at a temperature of between about 900° F. and about 1050° F., for a period of time of between about one second and about 10 seconds, and in the presence of hydrogen gas at substantially atmospheric pressure; the molar proportion of hydrogen to 2-methylnaphthalene varying between about 1:1 and about 10:1.

5. A process for the production of naphthalene from a 2-methylnaphthalene, which comprises contacting said 2-methylnaphthalene with a catalyst comprising about 15 mole per cent nickel oxide, about 15 mole per cent chromia, and about 70 mole per cent alumina, said catalyst being promoted with about 3 mole per cent of potassium nitrate, at a temperature of about 1000° F., for about 2.5 seconds, and in the presence of hydrogen gas at substantially atmospheric pressure; the molar proportion of hydrogen to said 2-methylnaphthalene being about 6.

References Cited in the file of this patent

UNITED STATES PATENTS

| Number | Name | Date |
|---|---|---|
| 2,194,449 | Sachanen et al. | Mar. 19, 1940 |

FOREIGN PATENTS

| Number | Country | Date |
|---|---|---|
| 127,690 | Switzerland | Sept. 1, 1928 |